US008007683B2

United States Patent
Starick et al.

(10) Patent No.: US 8,007,683 B2
(45) Date of Patent: Aug. 30, 2011

(54) CARBIDONITRIDOSILICATE LUMINESCENT SUBSTANCE

(75) Inventors: Detlef Starick, Greifswald (DE); Sven Rösler, Eisenach (DE); Sylke Rösler, Eisenach (DE); Hubertus Thoresia Hintzen, Eindhoven (NL); Yuan Qiang Li, Nanjing (CN)

(73) Assignees: Leuchtstoffwerk Breitungen GmbH (DE); Triodonic.atco Optoelectronics GmbH (AT)

( * ) Notice: Subject to any disclaimer, the term of this patent is extended or adjusted under 35 U.S.C. 154(b) by 727 days.

(21) Appl. No.: 12/065,480

(22) PCT Filed: Aug. 29, 2006

(86) PCT No.: PCT/EP2006/065788
§ 371 (c)(1),
(2), (4) Date: Feb. 29, 2008

(87) PCT Pub. No.: WO2007/025973
PCT Pub. Date: Mar. 8, 2007

(65) Prior Publication Data
US 2008/0251764 A1 Oct. 16, 2008

(30) Foreign Application Priority Data
Aug. 30, 2005 (DE) .......................... 10 2005 041 153

(51) Int. Cl.
*H05B 33/14* (2006.01)
(52) U.S. Cl. .................. 252/301.4 F; 257/98; 313/503; 313/486
(58) Field of Classification Search ............ 252/301.4 F; 313/503, 486; 257/98
See application file for complete search history.

(56) References Cited

FOREIGN PATENT DOCUMENTS

| EP | 1104799 A1 | 6/2001 |
| EP | 1413619 A1 | 4/2004 |
| EP | 1238041 B1 | 1/2005 |
| EP | 1560274 A1 | 8/2005 |
| WO | 2004030109 A1 | 4/2004 |
| WO | 2004047138 A2 | 6/2004 |
| WO | 2004055910 A1 | 7/2004 |
| WO | 2005083037 A1 | 9/2005 |
| WO | WO 2005/083037 * | 9/2005 |

OTHER PUBLICATIONS

Zhang et al, "Preparation, Structure and Luminescent Properties of Y2Si4N6C:Ce3+ and Y2Si4N6C:Tb3+", Jour. Electrochem. Soc., 153 (7), pp. H151-H154, May 23, 2006.*
H.A. Höppe et al., "High-temperature synthesis, crystal structure, optical properties, and magnetism of the carbidonitridosilicates H02[Si4N6C] and Tb2{Si4N6C]", J. Mater. Chem., vol. 11, 2001, pp. 3300-3306.
K. Lidell et al., M2(Si, Al)4(N,C)7 (M=La, Y, Ca) carbonitrides II. "The Crystal Structure of Ca0.8Y1.2Si4N6.8C0.2" , Journal of the European Ceramic Society, vol. 25, May 18, 2004, pp. 49-54.
K. Lidell et al., "M2(Si, Al)4(N,C)7 (M=La, Y, Ca) carbonitrides I. Synthesis and structural characterisation by XRD and NMR", Journal of the European Ceramic Society, vol. 25, May 15, 2004, pp. 37-47.

* cited by examiner

*Primary Examiner* — C. Melissa Koslow
(74) *Attorney, Agent, or Firm* — Mayer & Williams PC; Mark D. Wieczorek

(57) ABSTRACT

The invention relates to a luminescent substance consisting of a doped host lattice which absorbs at least one part of exciting radiation when it is excited by a high-energy radiation, thereby releasing an energy-poor emission radiation. The host lattice is embodied in the form of a carbidonitridosilicate-based compound. An illuminant which is used for producing white light and comprises a light emitting element and said luminescent substance are also disclosed.

20 Claims, 4 Drawing Sheets

CARBIDONITRIDOSILICATE LUMINESCENT SUBSTANCE

FIELD OF THE INVENTION

The present invention relates to inorganic luminescent materials capable of effectively absorbing high-energy excitation radiation and converting it with a high efficiency into a lower-energy emission radiation. UV radiation or blue light in particular is suitable as the excitation radiation, resulting in emissions in the green, yellow, orange and/or red range of the visible spectrum following conversion of the radiation.

BACKGROUND OF THE INVENTION

It has long been known that inorganic luminescent substances may be used to advantage to visualize invisible radiation images (e.g., in radiological diagnostics or display technology) and also for the purpose of general illumination (e.g., in fluorescent lamps or to produce white LEDs). Such luminescent substances usually have a host lattice doped with special elements. So far mostly sulfides, halides and oxides have been used as the host lattice for such luminophores in industrial applications but also to a particularly great extent, complex salts of oxygen-containing acids (borates, aluminates, silicates, phosphates, molybdates, tungstates, etc.) are used.

Only in recent years has it also been possible to develop nitridic materials (such as the red-emitting compounds of the type $M_2Si_5N_5:Eu^{2+}$ where M=Ca, Sr, Ba described by Hintzen et al. in EP 1 104 799 A1 and EP 1 238 041 B1, for example) and oxynitridic materials (examples include the blue, green and yellow-emitting europium- or cerium-doped $MSi_2O_2N_2$ compounds according to Delsing et al. in WO 2004/030109 A1; M=Ca, Sr, Ba) as the host lattice for synthesis of efficient luminescent substances. The interest in such luminophores has since then grown to a great extent, especially in conjunction with their advantageous use as conversion luminescent substances for the production of white LEDs. This is attributed in particular to the fact that because of the high covalency of the chemical bonds and the proven marked rigidity of the basic lattice, a particularly high chemical and thermal stability is expected of materials of this type. The disadvantages of the mostly sulfidic and oxygen-dominated conversion luminescent substances is mainly that their luminescence efficiency usually declines very rapidly at temperatures above 100° C. However, for the production of more advanced white LEDs with a higher wattage, conversion luminescent substances with a greatly improved thermal stability are needed.

On the other hand, it should be pointed out in this context that all the inorganic conversion luminescent materials currently used industrially (yttrium aluminates, thiogallates, alkaline earth sulfides, alkaline earth silicates, nitrides, oxynitrides) which are used to produce white light in combination with blue-emitting LEDs, are without exception $Eu^{2+}$ and/or $Ce^{3+}$-activated systems with an extremely broadband emission. Electronic 5d-4f transitions which may easily be influenced by an external crystal field and thus naturally also by extinction centers that may be present are characteristic of such luminescent substances. The situation is fundamentally different than that when using luminophores in fluorescent lamps. In this case, the main substances used as red and green components are line-emitting luminescent substances in which the luminescence phenomena to be observed are attributed to transitions between the 4f electrons (4f-4f transitions) that are shielded with respect to the effects of external crystal fields.

High covalent bonding components are also characteristic of another class of compounds only recently discovered. These are the carbidonitridosilicates containing rare earth metals and/or alkaline earth metals. The first representatives of this class of materials (e.g., the compounds $Ho_2Si_4N_6C$, $Tb_2Si_4N_6C$ (cf. Höppe et al., J. Mater. Chem 11 (2001) 3300) and $(La,Y,Ca)_2(Si,Al)_4(N,C)_7$ (cf. Lindel et al., J. Eur. Chem Soc. 25 (2005) 37) have been synthesized and described with respect to their basic physicochemical properties.

Information about the luminescence of such compounds has so far been completely unavailable in the technical literature. Now, however, SCHMIDT et al. have presented cerium-activated carbidonitridosilicate materials, in particular luminescent substances having the composition $Y_2Si_4N_6C:Ce$ with an activator concentration of 5% Ce in the patent WO 2005/083037 A1, which was published after the priority date of the present application. On excitation with UV radiation or with the light of blue-emitting LEDs, these materials luminesce in a broadband in the yellow spectral range and, according to the published information, have practically the same performance data with regard to quantum yield, absorption efficiency and temperature characteristics as the corresponding parameters of other known yellow-emitting conversion luminescent substances such as yttrium aluminum garnets, which are also doped with cerium, or $Eu^{2+}$-activated alkaline earth orthosilicates.

SUMMARY OF THE INVENTION

However, the object of the present invention is to propose novel carbidonitridosilicate luminescent materials, in particular for use in efficient white LEDs, which are characterized by original or improved luminescence properties.

This object is achieved by the luminescent substances defined in the attached claims.

The inventive materials belong to the class of carbidonitrides, in particular carbidonitridosilicates. They may be used alone or in combination with other suitable luminophores as conversion luminescent substances for the production of light sources, in particular for the production of white-emitting LEDs.

The insertion of carbon ions into the corresponding nitridosilicate matrix is associated with a further increase in the covalence of the lattice. Based on this fact, the lower tendency toward thermal extinction of the luminescence, the high chemical and thermal stability and the low tendency toward aging can be mentioned as special advantages of the inventive luminescent substances.

A general formula for the luminescent substances according to the present invention would be:

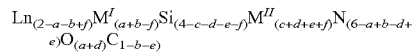

where $0 \leq a \leq 2$, $0 \leq b < 1$, $0 \leq c < 4$, $0 \leq d < 4$, $0 \leq e < 1$, $0 \leq f \leq (a+b)$ and $0 \leq (b+e) < 1$, where Ln denotes at least one of the metals indium (In), scandium (Sc), yttrium (Y) and for the rare earths, in particular for the elements lanthanum (La), gadolinium (Gd) and luthetium (Lu) and/or for mixtures of these metals.

As shown in the general formula, however, in a special embodiment, Ln may also be replaced partially or entirely by a divalent metal $M^I$, preferably by zinc (Zn) or by alkaline earth metals such as magnesium (Mg), calcium (Ca), strontium (Sr) and barium (Ba) if equimolar amounts of nitrogen (N) are to be replaced by oxygen (O) or if carbon (C) is to be replaced by nitrogen (N).

In yet another modification of this embodiment, silicon (Si) may be replaced by a component $M^{II}$, e.g., by germanium (Ge) and/or boron (B) and/or aluminum (Al). In the last cases mentioned, equimolar amounts of N must also be replaced by O or equimolar amounts of C must be replaced by N or equimolar amounts of $M^I$ must be replaced by Ln.

Depending on the exact composition of the basic lattice of luminescent material, different crystal structures with different lattice sites for the incorporation of rare earth and/or transition metal activator ions can be implemented. Preferred activators include cerium and/or terbium and europium or certain transition metal elements that may be incorporated into the matrix as divalent ions (in particular $Eu^{2+}$) or trivalent ions (in particular $Ce^{3+}$, $Tb^{3+}$, $Eu^{3+}$).

The concentration of activators may be 0.001 to 1.5 mol activator per mol luminescent substance. The cerium which is optionally added as a coactivator may be present in concentrations of 0.0005 to 1.5 mol cerium per mol luminescent substance.

Preferred embodiments of the inventive luminescent substances are determined by the following formulas:

Preferred embodiments of the inventive luminescent substances are determined by the following formulas:

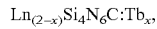
$Ln_{(2-x)}Si_4N_6C:Tb_x$,

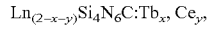
$Ln_{(2-x-y)}Si_4N_6C:Tb_x, Ce_y$, or

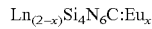
$Ln_{(2-x)}Si_4N_6C:Eu_x$

The inventive luminescent substances emit a green, yellow, orange or red-colored luminescent radiation when excited in the UV spectral range (200 to 380 nm) and/or in the violet spectral range (380 to 420 nm) or in the blue spectral range (420 to 480 nm). They have an absorption for the excitation radiation and are also characterized by a high quantum efficiency and a low thermal luminescence extinction.

Because of these features and additional advantageous properties, the inventive luminescent substances may be used advantageously both as individual components and as a mixture of several inventive luminescent substances or in combination (mixture) with other known blue, green, yellow or red-emitting conversion luminescent substances for the production of white LEDs.

With the present invention, efficient rare-earth-activated luminescent substances with 4f-4f line spectra that can be excited in the blue spectral range are made available for the first time for the production of white LEDs, because it has surprisingly been found that simultaneous doping of certain inventive carbidonitridosilicate luminescent substance basic lattices with terbium and cerium ions leads to a green $Tb^{3+}$ line emission that is excitable with the light of blue LEDs. Rare-earth-activated luminophores with 4f-4f line emissions have the advantages described above with respect to resistance to the effects of external crystal fields and extrinsic extinction factors. In addition, when using the inventive $Ce^{3+}$-$Tb^{3+}$-codoped carbidonitridosilicate luminescent substances as the green component in white LEDs, however, even more advantages can be utilized. First, the main peak of the $Tb^{3+}$ emission, which is located at approx. 545 nm, has an extremely low half-value width in comparison with the corresponding broadband spectra; secondly, the emission spectrum consists of additional line groups which are distributed over the entire visible spectral range. The property mentioned first is advantageous when using corresponding white LEDs for background lighting of LCDs (adaptation of the emission characteristics to the color filters used), while the characteristic spectral distribution of the luminescence of the $Ce^{3+}$-$Tb^{3+}$-coactivated luminescent substances, which is variable within certain limits (by varying the Ce/Tb ratio) contributes toward achieving improved color reproduction values (CRI=color rendering index) in the case of use in white LEDs for general lighting.

Another important advantage of the inventive approach may be seen in the fact that a novel red-emitting conversion luminescent substance can be synthesized in this way. Much stronger crystal fields can be implemented in inorganic nitride compounds than in the case of the oxygen-dominated luminescent substances. This is an important prerequisite for the desired red shift of the luminescence emitted by $Eu^{2+}$ ions, for example.

The experiments conducted in conjunction with the present invention have now surprisingly shown that even in doping the inventive basic lattice with europium ions, red-emitting luminescent substances are formed with excitation spectra that are suitable for use in white LEDs.

BRIEF DESCRIPTION OF THE FIGURES

Additional details, advantages and embodiments of the present invention are derived from the description of the manufacturing conditions for the luminophores as well as the accompanying figures, in which.

DETAILED DESCRIPTION

Figure 1:
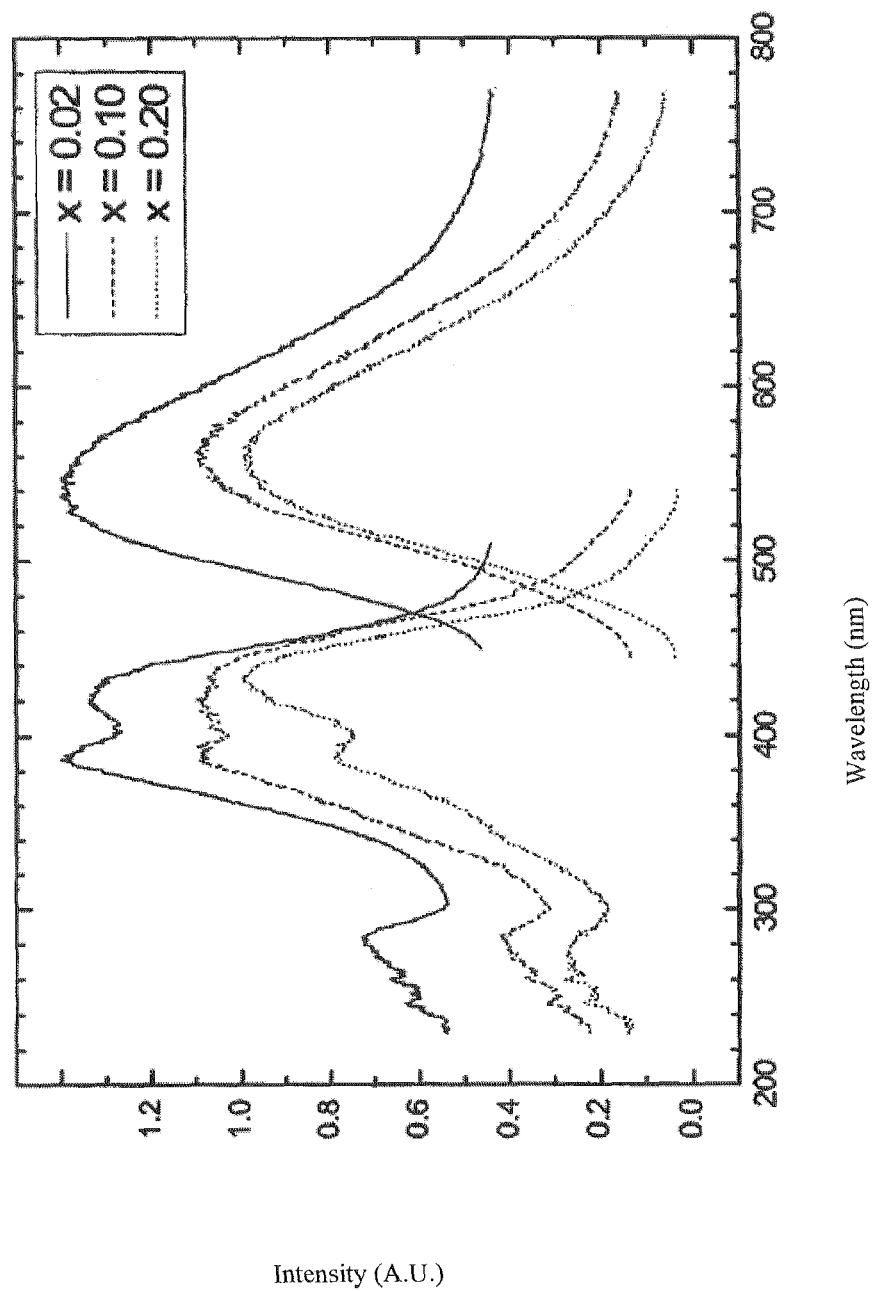
FIG. 1 shows the excitation spectra (left part of the figure) and emission spectra (right part) of cerium-doped $Y_2Si_4N_6C$ luminescent substances.

The carbidonitridosilicates containing the rare earth metals and/or alkaline earth metals as defined in the general formula given above are preferably produced by a high-temperature solid-state reaction. The details of the synthesis are described below as an example on the basis of a general preparation procedure and two exemplary embodiments for Ce- and Tb-doped and/or Eu-doped carbidonitridosilicate luminescent substances.

As starting materials, $\alpha$-$Si_3N_4$, $\beta$-$Si_3N_4$, carbon powder, SiC and the rare earths yttrium, cerium, terbium and europium are each used in metallic form. Before performing additional process steps, the rare earth metals are first nitrated in a nitrogen or ammonia atmosphere. Then the nitrated compounds are weighed in the respective stoichiometric amounts together with $Si_3N_4$, SiC or carbon powder and mixed thoroughly. Because of the moisture sensitivity of some starting materials, all these manipulations are performed in a glovebox under dry nitrogen. The powder mixtures are placed in suitable crucibles and calcined for 2 to 48 hours at temperatures of 1500° C. to 1800° C. in high-temperature ovens under pure nitrogen. After the end of the calcining process, the samples are cooled to room temperature and optionally subjected to a suitable aftertreatment.

EXAMPLE 1

For preparation of the terbium- and cerium-activated carbidonitridosilicates $Y_{1.00}Si_4N_6C:Tb_{0.99}Ce_{0.01}$, terbium metal is first nitrated for 12 hours at 1200° C. in a horizontal tubular oven under a pure nitrogen atmosphere to yield $TbN_x$ (x≈0.99).

The starting materials 34.24 g $TbN_x$, 17.78 g yttrium metal, 0.28 g cerium metal, 28.06 g α-$Si_3N_4$ and 8.02 g SiC are then mixed thoroughly in an agate mortar under a dry nitrogen atmosphere and then placed in a molybdenum crucible. This powder mixture is then calcined for 10 hours at 1600° C. under pure nitrogen and next cooled to room temperature in the oven. After removing soluble components and those that have not reacted, there remains a green-emitting luminescent substance having the composition $Y_{1.00}Si_4N_6C:Tb_{0.99}Ce_{0.01}$.

EXAMPLE 2

To produce a carbidonitridosilicate activated with 5% europium and having the composition $Gd_{1.8}Sr_{0.2}Si_4N_{6.2}C_{0.8}$, pure strontium metal and europium metal are nitrated to the precursors $Sr_3N_2$ and EuN at 850° C. for two hours under a pure nitrogen atmosphere in a horizontal tubular oven. Then 56.61 g gadolinium metal, 2.91 g $Sr_3N_2$, 1.66 g EuN, 29.93 g α-$Si_3N_4$ and 6.42 g SiC are mixed thoroughly in a dried nitrogen atmosphere and placed in a thermally resistant crucible. The mixture is calcined for 24 hours at 1750° C. in a nitrogen-hydrogen atmosphere (90:10). After suitable sample workout, a substance with an efficient red luminescence is obtained.

The accompanying figures are mostly self-explanatory for those skilled in the art of luminescent substances. The basic information has already been presented above. As supplementary information, only a few particulars are given below.

FIG. 1 shows that $Y_2Si_4N_6C$ luminescent substances doped only with cerium ions will luminesce in the yellow-green spectral range when excited with radiation between 360 and 450 nm. The various curves are each based on different doping concentrations whose values are shown in the diagram.

Figure 2:
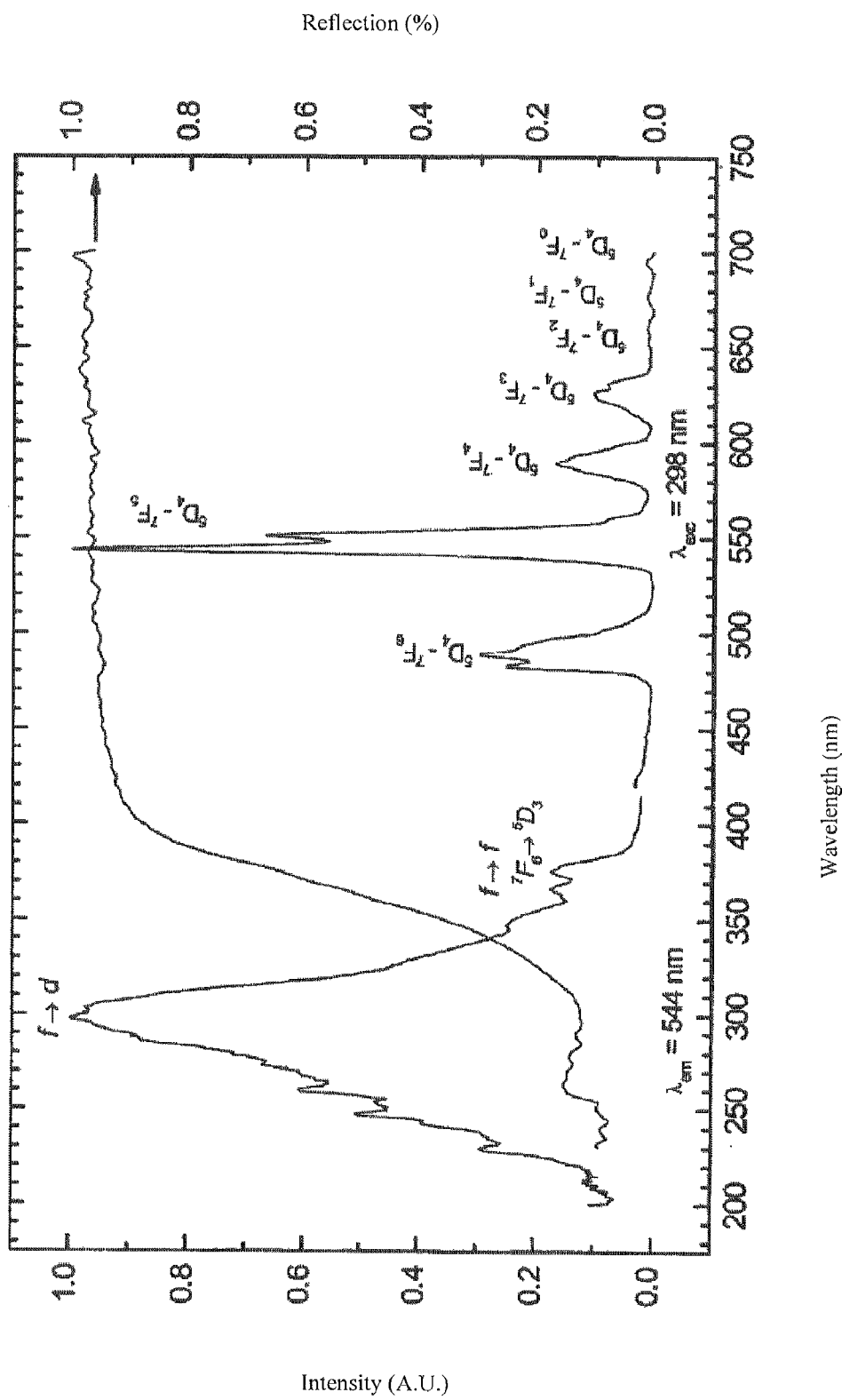
FIG. 2 shows the diffuse reflection spectrum, the excitation spectrum and the line emission spectrum of a $Tb^{3+}$-activated $Y_2Si_4N_6C$ phosphorus.

FIG. 2 shows that $Y_2Si_4N_6C$ luminescent substances activated with $Tb^{3+}$ alone must be excited in the range between 280 and 320 nm to achieve an efficient green $Tb^{3+}$ line emission.

Figure 3:
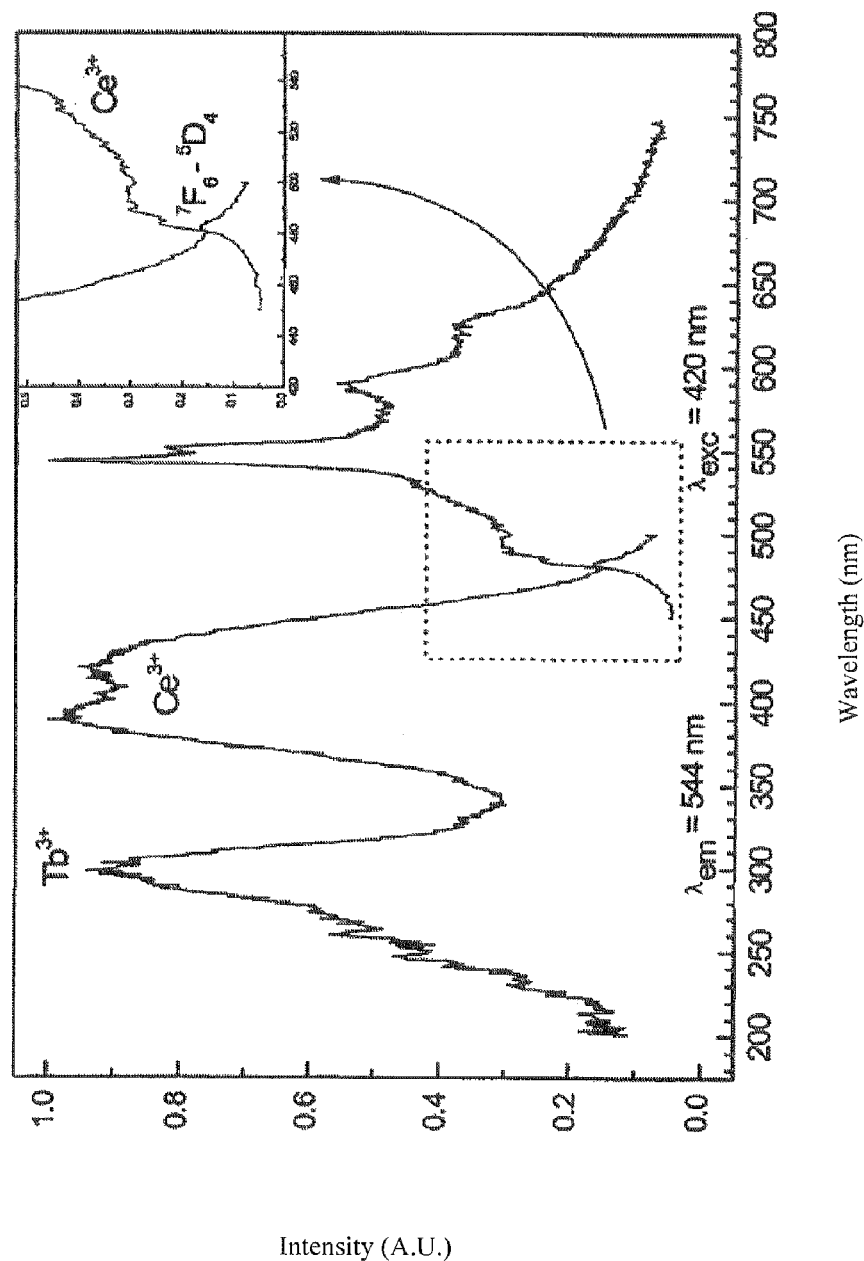
FIG. 3 shows the excitation spectrum (left part of the figure) and the emission spectrum (right part) of a Ce- and Tb-codoped $Y_2Si_4N_6C$ material.

FIG. 3 shows well that a Ce- and Tb-codoped $Y_2Si_4N_6C$ host lattice can also be excited efficiently in the range between 360 and 450 nm. In the selected example, this results in a $Tb^{3+}$ line emission superimposed on the $Ce^{3+}$ broadband emission. However, Ce/Tb concentration ratios at which the terbium line emission is definitely predominant and the cerium luminescence is greatly suppressed can also be found.

Figure 4:
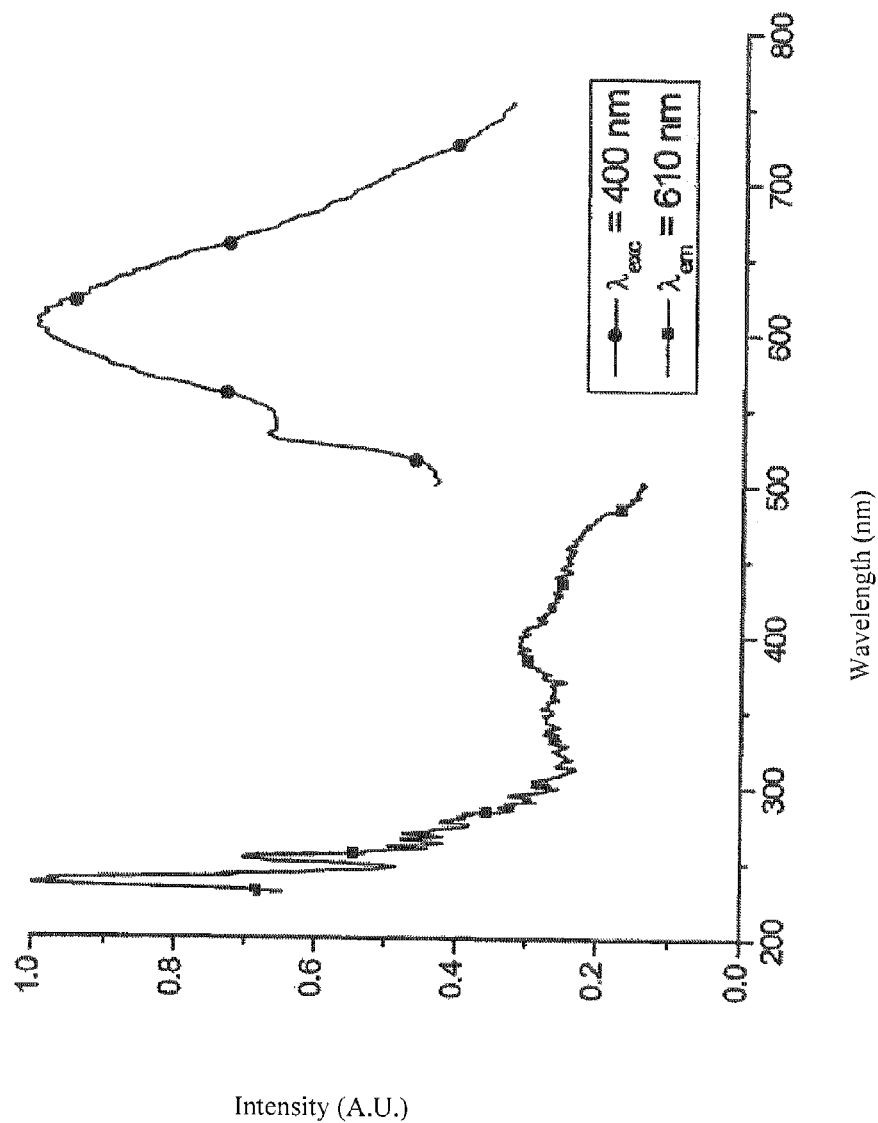
FIG. 4 shows the excitation and emission spectrum of a europium-activated $Y_2Si_4N_6C$ luminescent material.

Finally, FIG. 4 shows that even the emission band of the europium-activated $Y_2Si_4N_6C$ matrix recorded at a maximum wavelength of 610 nm can be excited in the range of 350 to 480 nm that is of interest.

Although only a few embodiments have been described here in greater detail, it will be clear to those skilled in the art that numerous modifications of the inventive luminescent substance are possible. The possible variations have been indicated by providing equations of general validity and listing possible replacement elements.

The invention claimed is:

1. A luminescent substance comprising a doped host lattice, which, on excitation with a high-energy excitation radiation, absorbs at least a portion of this excitation radiation and then emits a lower-energy emission radiation, wherein the host lattice is a carbidonitridosilicate compound, which is not doped with cerium as an activator.

2. The luminescent substance of claim 1, wherein the luminescent substance can be excited to emission by radiation with wavelengths of 200 to 480 nm.

3. The luminescent substance of claim 2, wherein with appropriate excitation, a green, yellow, orange or red-colored emission radiation is emitted.

4. The luminescent substance of claim 1, wherein, on excitation with blue excitation radiation, the luminescent substance emits a radiation having a line spectrum which results from 4f-4f electron transitions.

5. A luminescent substance from a doped host lattice, which absorbs at least a portion of the excitation radiation on excitation with a high-energy excitation radiation and then emits a lower-energy emission radiation, wherein the host lattice is a compound having the following general formula

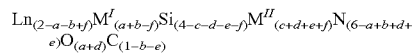

where $0 \leq a \leq 2$, $0 \leq b < 1$, $0 \leq c < 4$, $0 \leq d < 4$, $0 \leq e < 1$, $0 \leq f \leq (a+b)$, and $0 \leq (b+e) < 1$, where Ln is an element or mixture of elements of the following group:
indium (In),
scandium (Sc),
yttrium (Y),
rare earths;

$M^I$ is a divalent metal or a mixture of divalent metals; and
$M^{II}$ is an element or a mixture of elements of the following group:
germanium (Ge),
boron (B),
aluminum (Al); and
wherein $Tb^{3+}$ ions as activators and $Ce^{3+}$ ions as coactivators are doped into the host lattice.

6. The luminescent substance of claim 5, wherein when $M^I$ and/or $M^{II}$ are present, equimolar amounts of nitrogen (N) are replaced by oxygen (O) and/or equimolar amounts of carbon (C) replaced by nitrogen (N).

7. The luminescent substance of claim 5, wherein the concentration of activators is 0.001 to 1.5 mol activator per mole luminescent substance.

8. The luminescent substance of claim 5, wherein cerium as the coactivator is doped into the host lattice in a concentration of 0.0005 to 1.5 mol cerium per mol luminescent substance.

9. The luminescent substance of claim 5, wherein the component Ln is an element from the group lanthanum (La), gadolinium (Gd) and luthetium (Lu).

10. The luminescent substance of claim 5, wherein the component $M^I$ contains zinc (Zn).

11. The luminescent substance of claim 5, wherein the component $M^I$ contains one or more alkaline earth metals, in particular Mg, Ca, Sr, Ba.

12. A luminescent substance from a doped host lattice, which absorbs at least a portion of the excitation radiation on excitation with a high-energy excitation radiation and then emits a lower-energy emission radiation, wherein the host lattice is a compound having the following general formula

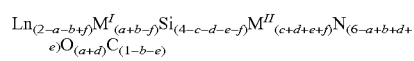

where $0 \leq a \leq 2$, $0 \leq b < 1$, $0 \leq c < 4$, $0 \leq d < 4$, $0 \leq e < 1$, $0 \leq f \leq (a+b)$, and $0 \leq (b+e) \leq 1$, where Ln is an element or mixture of elements of the following group:
indium (In), scandium (Sc),
yttrium (Y),
rare earths;

$M^I$ is a divalent metal or a mixture of divalent metals; and $M^{II}$ is an element or a mixture of elements of the following group:
germanium (Ge),
boron (B),
aluminum (Al); and the doped activators in the host lattice are divalent or trivalent rare earth ions or transition metal ions, wherein at least one of the parameters c, d, e or f is selected to be greater than zero.

13. The luminescent substance of claim 12, wherein the component Ln is an element from the group lanthanum (La), gadolinium (Gd) and luthetium (Lu).

14. The luminescent substance of claim 12, wherein the component $M^I$ contains zinc (Zn).

15. The luminescent substance of claim 12, wherein the component $M^I$ contains one or more alkaline earth metals, in particular Mg, Ca, Sr, Ba.

16. A luminescent substance from a doped host lattice, which absorbs at least a portion of the excitation radiation on excitation with a high-energy excitation radiation and then emits a lower-energy emission radiation, wherein the host lattice is a compound having the following general formula $$Ln_{(2-a-b+f)}M^I_{(a+b-f)}Si_{(4-c-d-e-f)}M^{II}_{(c+d+e+f)}N_{(6-a+b+d+e)}O_{(a+d)}C_{(1-b-e)}$$

where $0 \leq a \leq 2$, $0 \leq b < 1$, $0 \leq c < 4$, $0 \leq d < 4$, $0 \leq e < 1$, $0 \leq f \leq (a+b)$, and $0 \leq (b+e) < 1$, where Ln is an element or mixture of elements of the following group:
indium (In),
scandium (Sc),
yttrium (Y),
rare earths;

$M^I$ is a divalent metal or a mixture of divalent metals; and $M^{II}$ is an element or a mixture of elements of the following group:
germanium (Ge),
boron (B),
aluminum (Al); and the doped activators in the host lattice are divalent or trivalent rare earth ions or transition metal ions, wherein at least one of parameters a or d is selected to be greater than zero.

17. The luminescent substance of claim 16, wherein the component Ln is an element from the group lanthanum (La), gadolinium (Gd) and luthetium (Lu).

18. The luminescent substance of claim 16, wherein the component $M^I$ contains zinc (Zn).

19. A light source for generating white light, comprising an LED and at least one luminescent substance according to claim 1, which is excited by the excitation radiation generated by the emitting LED and emits emission radiation in another spectral range.

20. The light source of claim 19, wherein the LED emits light in the wavelength range of 200 to 480 nm and the luminescent substance emits blue, green, yellow or red radiation.

* * * * *